United States Patent Office 3,317,492
Patented May 2, 1967

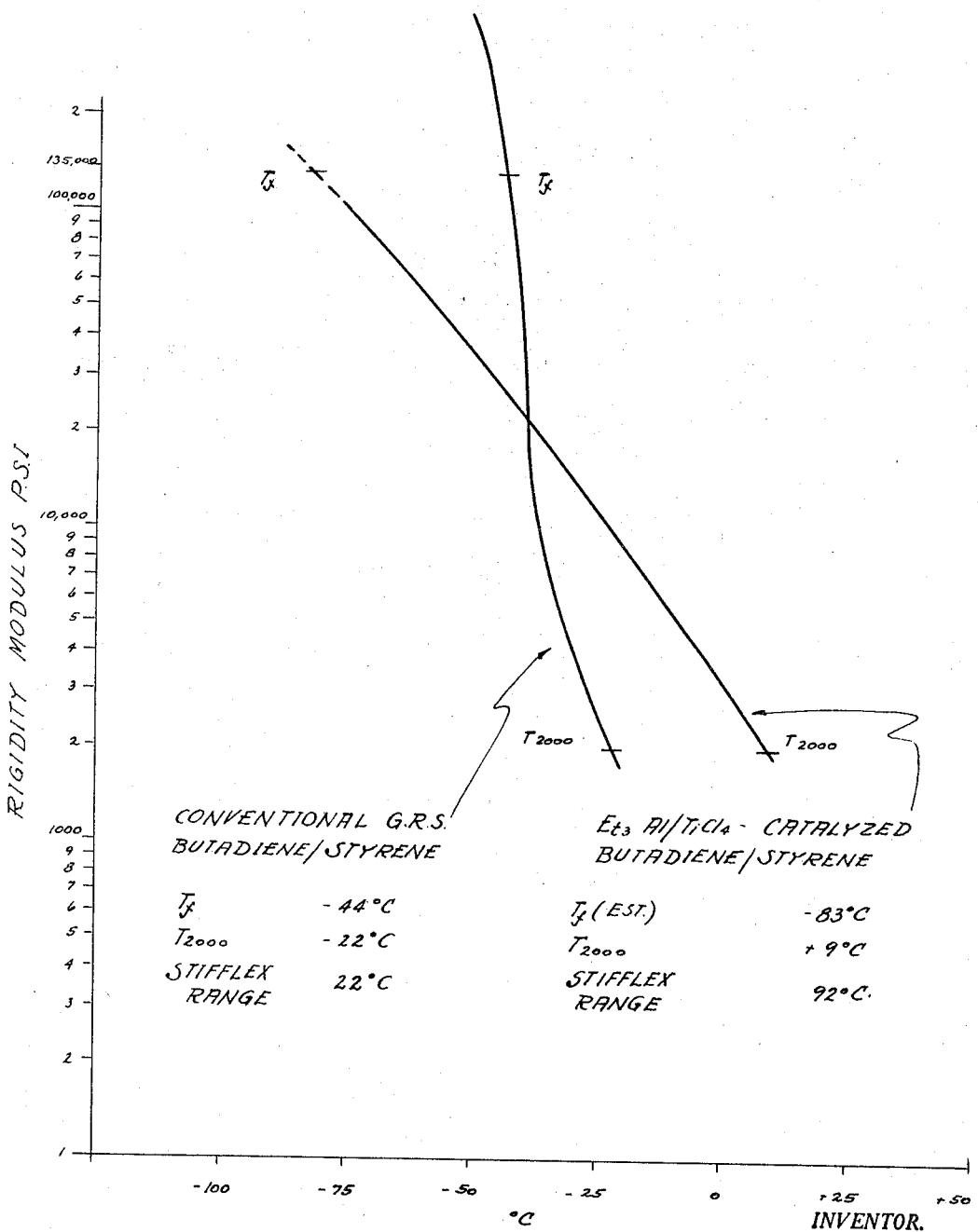

3,317,492
PROCESS FOR COPOLYMERIZING A CONJUGATED DIOLEFIN AND A VINYL AROMATIC HYDROCARBON WITH A COORDINATION CATALYST AND THE PRODUCT
Carroll A. Hochwalt, Clayton, Mo., assignor to Monsanto Company, a corporation of Delaware
Filed Apr. 18, 1955, Ser. No. 501,795
11 Claims. (Cl. 260—79.5)

This invention relates to the copolymerization of butadiene or isoprene with vinyl aromatic hydrocarbons. In preferred aspects, the invention pertains to the copolymerization of butadiene with styrene. In some of its aspects the invention provides a new type of polymeric material, i.e., high molecular weight synthetic rubbery polymers having exceptionally low temperature flexibility. In other aspects the invention provides rubbery copolymers of butadiene or isoprene with styrene or other vinyl aromatic hydrocarbons, containing a major proportion by weight of diolefin and a minor proportion by weight of vinyl aromatic hydrocarbon, which are flexible at much lower temperatures than synthetic rubbers prepared from the same monomers under conventional conditions yet are stiffer than said conventional polymers at temperatures ranging from somewhat below room temperature and above. Still other aspects of the invention provide vulcanized copolymers having the properties just mentioned. Yet other aspects of the invention provide improvements in the copolymerization of butadiene and/or isoprene with vinyl aromatic hydrocarbons in the presence of catalysts exemplified by the material obtained by the interaction of a trialkylaluminum with titanium tetrachloride.

There is a great need for elastomeric materials which can be vulcanized, which have appreciable strength and body at temperatures such as 0° C. on up to 100° C. and higher, while retaining flexibility at extremely low temperatures, such as minus 30° C. to minus 75° C. and even lower. Such materials are particularly important to the military, for equipment to be used under arctic conditions, and particularly for aircraft, rockets, guided missiles and the like to be used at extremely high altitudes where very low temperatures are encountered.

The present invention provides an elastomeric material suitable for these uses, and having low temperature properties that are outstanding and indeed unique. The copolymers prepared in accordance with the invention are rubbery, can be subjected to all of the conventional processing steps including incorporation of vulcanizing agents such as sulfur, accelerators, antioxidants, fillers, reinforcing agents, pigments, plasticizers, other polymers, and the like, can be milled, mixed in Banbury mixers, and handled in the various other ways known to the rubber industry, and can be formed, by compression molding, extrusion, etc., into a wide variety of articles such as pneumatic tires for vehicles, gaskets, sealing rings, fabric coating, flexible tubing and the like, followed by vulcanization to produce a high strength article having excellent flexibility at extreme low temperatures.

The accompanying drawing shows the relationship of stiffness to temperature (Clash-Berg curve) for a preferred product of the invention, and for a conventional butadiene/styrene copolymer (GRS).

The comonomers employed in the present invention are butadiene, isoprene or mixtures of the same, on the one hand, with a vinyl aromatic hydrocarbon or mixture of vinyl aromatic hydrocarbons on the other hand. I refer to vinyl aromatic hydrocarbons generally, i.e., hydrocarbons containing a $CH_2=CH-$ group directly attached to an aromatic ring, e.g., vinyltoluene, vinylnaphthalene, vinylxylene, vinylmethylnaphthalene, vinylisopropylbenzene and the like. The copolymerization is desirably effected in the presence of catalysts prepared by the interaction of (a) an aluminum compound of the general formula $R_2AlX$ wherein R is an alkyl, cycloalkyl or aryl radical and X is hydrogen, halogen, or an alkyl, cycloalkyl, or aryl radical, with (b) a metal halide selected from the group consisting of chlorides, bromides and iodides of titanium and zirconium. The practice of the various aspects of the invention will be described by way of example, with particular reference to catalysts prepared by the interaction of trialkylaluminums, e.g., triethylaluminum, triisobutylaluminum, trioctylaluminum, with titanium tetrachloride. Particular reference will also be made to the use of butadiene and styrene by way of example, but it is to be understood that other monomers of the named classes are also meant, and that the particular monomers and proportions of same will be chosen in order to obtain the desired physical characteristics.

The invention is broadly applicable to the copolymerization of butadiene and/or isoprene on the one hand, with styrene or other vinyl aromatic hydrocarbon or mixture of vinyl aromatic hydrocarbons on the other hand, in all proportions, ranging from the smallest quantity of the diolefin that will significantly affect the properties of a predominantly vinyl aromatic hydrocarbon polymer containing same to the smallest proportion of a vinyl aromatic hydrocarbon that will significantly affect the properties of a predominantly diolefin polymer containing same. Of particular value and interest are those copolymers containing in the polymer molecule in combined form a major proportion by weight of the diolefin monomer (or monomers) and a minor proportion by weight of the vinyl aromatic hydrocarbon monomer (or monomers), and preferably those containing from 5 to 40 weight percent vinyl aromatic hydrocarbon in the polymer. Thus, a preferred product is a rubbery copolymer of butadiene and styrene containing sufficient styrene (or other vinyl aromatic hydrocarbon) to significantly increase the stiffness of the polymer which would otherwise be obtained by polymerizing butadiene in the absence of the added styrene, yet insufficient to destroy the essentially elastomeric nature of the product and the desirable low temperature flexibility thereof. Ordinarily it will be desirable to charge to the reaction a smaller weight of vinyl aromatic hydrocarbon than of butadiene and/or isoprene although it may be desirable in some instances to charge a larger weight of vinyl aromatic hydrocarbon than the diolefin to the polymerization and still obtain a polymer having less than 50 weight percent vinyl aromatic hydrocarbon in combined form in the polymer. This is possible under some circumstances because the rate at which the diolefin enters into polymerization is considerably faster than that at which the vinyl aromatic hydrocarbon enters into polymerization. A polymer containing a major amount of styrene and a minor amount of butadiene can be made which has a rigidity at ordinary temperatures similar to that of leather. Such a product is of value for shoe soles, luggage, handbags, etc. The following polymer compositions are mentioned by way of example of desirable products, the percentages being the weight percentage of the named monomer present in combined form in the polymer.

Butadiene 60, styrene 40
Isoprene 60, styrene 40
Butadiene 60, styrene 30, vinyltoluene 10
Butadiene 50, isoprene 10, styrene 40
Butadiene 60, isoprene 30, vinyltoluene 10
Butadiene 75, styrene 25
Butadiene 25, styrene 75
Butadiene 8, isoprene 2, styrene 90
Butadiene 15, styrene 85

While the polymerization of this invention can be carried out with a variety of combinations of variables, it is usually preferred to carry out the polymerization at a temperature below about 35° C., and/or by the use of trialkylaluminums containing long alkyl groups, e.g., those averaging at least 8 carbon atoms per alkyl group. These preferred procedures are desirable for the purpose of increasing the yield of the polymer.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned: triethylaluminum, triisobutylaluminum, trioctylaluminum, didodecyloctylaluminum, diisobutylaluminum hydride, tridodecylaluminum, diphenylaluminum bromide, dipropylcyclohexylaluminum, ditolylmethylaluminum, tri-($\beta$-phenylethyl)aluminum, diethylaluminum chloride, diisobutylaluminum chloride, diisobutylaluminum iodide, di($\beta$-cyclohexylpropyl)isobutylaluminum. It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc. of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 or up to 15:1 or higher. It is generally preferred to use an Al:Ti mol ratio between 2.0:1 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any aliphatic olefin compounds, and especially those ranging in boiling point up to 600° F. Also, benzene, toluene, ethylbenzene (very convenient in the case of styrene as the separation of styrene from ethylbenzene used as a starting material for the production of styrene is unnecessary), cumene, decalin, ethylene dichloride, chlorobenzene, diethyl ether, o-dichlorobenzene, dibutyl ether, tetrahydrofurane, dioxane.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced.

The amount of catalyst required is dependent on the other variables of the polymerization reaction, and although amounts as small as 0.01 weight percent based on total weight of monomers charged are sometimes permissible, it is usually desirable to use larger amounts, such as from 2 to 5 percent or even considerably higher. When polymerization is effected in the presence of a solvent, the catalyst to solvent weight ratio should be at least about 0.003:1.

The diolefin monomer and the vinyl aromatic hydrocarbon monomer are contacted with the catalyst in any convenient manner. A suitable procedure is to bring the catalyst and liquid vinyl unsaturated hydrocarbon monomer together with intimate agitation provided by suitable stirring or other means, followed by introduction of butadiene or isoprene either in the total quantity to be used during the polymerization, or gradually by intermittent or continuous addition to the reaction mixture. It is desirable to provide at least enough agitation during the polymerization to effect adequate and intimate admixture of diolefin with vinyl aromatic hydrocarbon and catalyst. Where the reaction is carried out at or near atmospheric pressure, it is convenient merely to bubble butadiene into the reaction mixture containing catalyst and part or all of the vinyl aromatic hydrocarbon monomer, at a rate not greatly in excess of the maximum rate at which the butadiene is taken up by polymerization. When isoprene is being charged, it can be introduced gradually as a liquid, or as a gas if the temperature is somewhat elevated above room temperature. The reaction can be carried out batchwise by providing the total vinyl aromatic hydrocarbon monomer and catalyst in a reaction vessel such as a mechanically stirred or shaken pressure bomb, into which is introduced the total diolefin to be used in the reaction. Preferably, however, especially in order to provide controlled reaction rates and avoid too great an extent of reaction during a limited peirod of time to cause undesirably high and possibly dangerous rise in temperature and pressure, at least the diolefin is added to such a bomb intermittently or continuously at a rate adapted to maintain an essentially constant pressure, which may be about atmospheric, or even sub-atmospheric which would seldom be advantageous, or often superatmospheric within the ranges described hereinafter. In such types of reaction the vinyl aromatic hydrocarbon can also be added gradually either continuously or intermittently, but is usually charged in toto at the beginning of the reaction. The interpolymerization of this invention is also readily adapted to continuous flow processes. For example, all monomers plus catalyst can be admixed and passed continuously through an elongated reaction tube of comparatively small diameter, which is contacted externally with suitable cooling medium to maintain desirable reaction temperatures. The diolefin, or in some cases the vinyl aromatic hydrocarbon, and/or the catalyst, can be added multipointwise along the length of the reaction tube if desired. These and numerous other variations in carrying out the polymerization will be well understood by those skilled in the polymerization art.

The catalyst is sensitive to various poisons, among which may be mentioned oxygen, water, carbon dioxide, carbon monoxide, and acetylenic compounds such as acetylene, vinylacetylene and the like. For this reason, suitable precautions should be taken to protect the catalyst and the reaction mixture from such materials. An excess of the aluminum compound, particularly mol ratios of aluminum to titanium or zirconium in excess of about 4:1 tends to give a certain amount of protection against these poisons. The diolefin need not be pure diolefin so long as it is reasonably free from poisons. Thus, a mixture of butadiene with butanes, with or without some butene, can be used, and such mixtures are readily obtainable from refinery gases and from butadiene manufacturing processes such as those involving dehydrogenation of butanes and butenes, thereby avoiding the treatment of same to provide the butadiene in highly concentrated form. However, it is preferred to separate the butadiene from the other hydrocarbons and obtain a butadiene content in the diolefin feed of at least 75 weight percent and preferably above 90 weight percent. The same considerations apply with respect to isoprene, which can be utilized in admixture with other close boiling hydrocarbons, including pentenes if desired, but which preferably ranges in purity from 75 to 90 percent isoprene and higher. As to the vinyl aromatic hydrocarbon monomer, its feed need not be pure so long as it is reasonably free from poisons. The styrene commercially sold as monomer grade is quite pure and highly satisfactory. However, styrene, vinyltoluene, vinylnaphthalene and other vinyl aromatic hydrocarbon monomer can be used in admixture with close boiling hydrocarbons present in admixture therewith as a result of manufacturing processes, e.g., ethylbenzene can be present in styrene prepared by dehydrogenation of ethylbenzene. As a general rule it can be stated that the vinyl aromatic hydrocarbon preferably ranges in purity from 75 to 90 percent and higher. As has also been mentioned above, a variety of solvents can be present during the reaction.

The polymerization can be effected over a wide range of temperatures, such as from the boiling point of butadiene or isoprene at atmospheric or superatmospheric pressure down to say minus 40° C. and even lower. It is usually preferred that the temperature be maintained at about 30° C. or below. A temperature ranging up to 100° C. and higher is satisfactory. It is seldom advantageous, however, to exceed 50 or 60° C., and room temperature is quite satisfactory.

The polymerization reaction is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The copolymer is essentially insoluble in the usual solvents at room temperature and even at somewhat elevated temperatures, so that in most instances the polymer separates out as insoluble material as it is formed. The reaction mixture can readily be worked up by filtering, centrifuging or otherwise removing the solid polymer from the liquid material. The solid polymer is then desirably washed with organic solvent for removal of catalyst residues which impart color to the polymer. It is often desirable to include a treatment with hydrochloric acid dissolved in a suitable organic solvent, e.g., methanol, and preferably with a small amount of water present, in order to obtain maximum removal of catalyst residues. The polymer can also be washed with isobutanol to effect considerable removal of catalytic materials. Many other procedures and materials can be used to work up the products and all such can be employed without departing from the invention. When the polymer is to be used in a finished composition or article in which a light color is not essential, a simple separation of polymer followed by a single washing with organic solvent may often be sufficient, as catalyst residues that may remain in the polymer after such treatment will not be objectionable because of their color. However, if the polymer is to be used for electrical insulation applications, thorough removal of catalyst residues is desirable.

The following discussion of compounding and vulcanizing has particular reference to the rubbery copolymers, and especially those containing a major weight proportion of diolefin and a minor proportion of vinyl aromatic hydrocarbon. However, it is an advantage of the invention that even those copolymers containing mostly vinyl aromatic hydrocarbon. However, it is an advantage of the invention that even those copolymers containing mostly vinyl aromatic hydrocarbon with only a small amount of diolefin can be compounded and vulcanized if desired, in which case the amounts of vulcanizing agent, e.g., sulfur, accelerator, etc. will be correspondingly smaller than those mentioned below. For many uses the low diolefin—high vinyl aromatic hydrocarbon copolymers are not vulcanized; in such cases they are often mixed with an antioxidant, plus any filler, pigment, other polymer, plasticizer, etc., should such be desired.

Sulfur is the preferred vulcanizing agent to use with the copolymers of this invention. However, other vulcanizing agents, e.g., sulfur monochloride, are also effective. Zinc oxide is also a valuable component of mixes to be vulcanized. The following recipes are given by way of example of complete recipes suitable for curing the copolymers of this invention to give desirable vulcanized compositions. Those skilled in the art, having had the benefit of these examples and the other information disclosed herein, will be able to devise a variety of other recipes suited to the particular intended use. In the following tabulation of recipes, the parts are by weight.

RECIPE I

| | |
|---|---|
| Butadiene 90/vinyltoluene 10 copolymer | 100.00 |
| Sulfur | 2.00 |
| Zinc oxide | 3.00 |
| Blanc fixe (barium sulfate) | 55.00 |
| Mercaptobenzothiazole (zinc salt) | 1.00 |
| Tetramethylthiuram monosulfide | 0.25 |
| Stearic acid | 1.25 |

Vulcanized by heating 6 min. at 310° F.

RECIPE II

| | |
|---|---|
| Isoprene 85/styrene 15 copolymer | 45.00 |
| Sulfur | 1.00 |
| Zinc oxide | 20.00 |
| Whiting | 30.00 |
| Iron oxide (red) | 1.00 |
| Chrome yellow | 0.50 |
| Lamp black | 0.30 |
| Mercaptobenzothiazole | 0.50 |
| Diphenylguanidine | 0.10 |

Vulcanized by heating at 260° F. for 1 hour.

RECIPE III

| | |
|---|---|
| Butadiene 70/styrene 30 copolymer | 100.00 |
| Sulfur | 2.50 |
| Zinc oxide | 5.00 |
| EPC carbon black | 45.00 |
| Mercaptobenzothiazole | 1.00 to 1.5 |
| Paraflux | 10.00 |

Vulcanized by heating at 260–275° F. for 5 min. per 1/32″ thickness.

The components of the various mixtures indicated above are brought into intimate admixture with each other in the usual way, as on mill rolls. As reinforcing agents, furnace, channel or acetylene black are all suitable although of course the properties of the final product will be dependent upon the particular black chosen as well as upon other factors. The furnace blacks are preferred in many instances. Of particular interest are the semi-reinforcing blacks (SRF) such as "Furnex," the high abrasion furnace blacks (HAF) such as "Philblack"-A and -O and "Statex-R, and the superabrasion furnace blacks (SAF) such as "Vulcan"-9. Black loading will naturally be dependent upon the properties desired in the final product, but in general will be within the range of 10 to 70 phr. and preferably 20 to 50 phr. (parts carbon black by weight per 100 parts rubber by weight). In addition to or instead of carbon black, other typical rubber reinforcing agents, e.g., finely divided silicas, can be employed. Also, fillers such as clays and the like, pigments, softeners, age-resistors, vulcanization accelerators, curing agents, etc. can be employed in proportions chosen to fit the end use of the compounded rubber. Among the well-known materials commercially available and from which choice can be made as desired, there can be mentioned by way of example clay, magnesium oxide, lead dioxide, calcium oxide, calcium carbonate, iron oxide, titanium dioxide, pumice, powdered leather, asbestos fibers, pine tar, Neozone D, sodium acetate, Santocure, Neozone A, Ureka C, El-Sixty, Captax, zinc laurate, diphenyl guanidine, Bardol, Carbonex, Polyac, Akroflex C, Acrowax C, Methyl Tuads, Altax; the compositions of those materials mentioned by trade-name are well known to those skilled in the art, and can be ascertained by reference to the literature of the manufacturers as well as standard reference works on chemical trade names.

The following specific example is given by way of illustration of one suitable combination of catalyst, conditions for catalyst preparation, monomers and proportions thereof, polymerization conditions, and methods of working up the product. It will be understood, however, that variations from the exact details given can be made without departing from the invention.

*Example*

A 500-ml. flask was set up with motor stirrer, thermometer, condenser, nitrogen inlet and funnels for adding catalyst components and styrene. These funnels were also equipped with nitrogen tubes. Lamp grade nitrogen was used to flush the reactor and addition funnels to avoid contact of catalyst components and reaction mixture with air. A sparger tube was provided for introduction of butadiene, the tube dipping into the liquid reaction mixture to a point just above the stirrer blade. Gaseous butadiene was first passed through a bubbler to determine the approximate rate of addition and then into the reactor through the sparger tube just described.

To the reactor was added 1.14 gram triethylaluminum in 100 ml. kerosene. There was then added dropwise 2.85 grams $TiCl_4$ in 10 ml. kerosene while stirring, followed by 90 ml. more kerosene. This was an Al:Ti mol ratio of 0.67:1. The catalyst mixture was stirred 10 minutes, and then additional of gaseous butadiene started.

Absorption of butadiene gas was quite rapid, and slowed to about ⅓ the original rate by the latter part of the run. The butadiene addition was continued for a period of 6 hours, 20 minutes, following which the reactor was sealed under nitrogen. Meanwhile, dropwise styrene monomer addition was started 10 minutes after the start of the butadiene addition, and completed 25 minutes later; the total styrene thus added was 10 grams. During the styrene addition and during at least most of and probably all the later addition of butadiene alone, the styrene and butadiene underwent copolymerization.

During the entire run the reactor had been held at room temperature, increased slightly by the heat of polymerization so that the actual temperature in the reactor ranged from 29 to 34° C. The pressure was atmospheric.

After standing overnight, the reaction mixture was treated with 200 ml. methanol containing 10 ml. concentrated aqueous HCl. After 15 minutes stirring the resulting mixture was placed in a separatory funnel and the lower (methanolic) layer separated. This layer, dark green in color, was discarded after treating a sample with acetone and finding no precipitate formed. The upper (kerosene) layer was cream-colored and contained suspended particles of flocculent precipitate. All of the kerosene layer was poured into about 500 ml. acetone, resulting in the precipitation of a large quantity of flocculent polymer. The polymer was washed twice with acetone by decantation and then twice more with acetone, filtering between washings. It was then dried in a vacuum oven at 50° C. The dried polymer weighed 4.8 grams.

The butadiene/styrene copolymer product was a low gel content material. It was molded readily by compression molding into a test sample which was subjected to the Clash-Berg test. This is a measure of the stiffness of a plastic specimen as a function of temperature, measured by means of a torsional test. It is essentially that described by Clash and Berg, Ind. Eng. Chem. 34, 1218 (1942). The brittle temperature ($T_f$) is the temperature at which the rigidity modulus is 135,000 p.s.i. The rubber temperature ($T_{2000}$) is the temperature at which the rigidity modulus is 2000 p.s.i.

This copolymer showed outstanding low temperature properties in the Clash-Berg test. The rigidity modulus-temperature curve thus obtained was nearly linear. Reference is made to the accompanying drawing, in which the Clash-Berg curve is shown for this polymer and for comparison the Clash-Berg curve is shown for conventional butadiene/styrene copolymer known as GR–S, prepared by emulsion polymerization. It will be seen that for the copolymer of the present invention the rigidity modulus at −75° C. (the lowest temperature available in the test equipment) was 105,000 p.s.i. The curve extrapolated to 135,000 p.s.i. gave an estimated $T_f$ of −83° C. The $T_{2000}$ was +9° C.; thus the estimated Stifflex Range (SR) was 92° C. (The Stifflex Range is defined as $T_{2000}$ minus $T_f$). In comparison, for the conventional butadiene/styrene copolymer, the $T_f$ was −44° C. and the $T_{2000}$ was −22° C., with the resulting Stifflex Range only 22° C. Thus, the slope of the modulus-temperature curve for the copolymer of this invention is much less than the corresponding slope for conventional copolymer which means that the temperature range between the two given modulus values is much greater for the material of this invention. From these data it is also apparent that this copolymer has a much lower second order transition temperature (approximated by $T_f$) than the conventional copolymer, and yet is much stiffer at the higher temperatures such as from −35° C. on up to atmospheric temperatures and higher. This very broad transition range is of much importance in practical applications of the rubber.

This polymer when subjected to the action of various solvents at room temperature over a period of one day was insoluble in dioxane, ethyl acetate, hexane, and dimethylformamide, and was swollen in carbon tetrachloride, ethylene dichloride, benzene, cyclohexanone and gasoline.

This butadiene/styrene copolymer can be readily vulcanized by any of the conventional vulcanization recipes, such as those employing sulfur. One suitable recipe is that given above under the heading Recipe III, using 100 parts of the copolymer of this Example. This mix, on heating at 140° C. for 5 minutes per 1/32" thickness, gives a tough vulcanized butadiene/styrene copolymer of outstanding low temperature flexibility and broad transition range.

It may be noted that in compounding recipes involving the use of carbon black or various fillers, reinforcing agents or pigments, such as clay, calcium carbonate, etc., in which the final product need not be light-colored for the intended use, the fresh polymer need not be subjected to such severe washing and treatment for removal of catalyst residues as is given in the preceding example.

While the invention has been described herein with particular reference to preferred embodiments thereof, it will be appreciated that variations from the details given herein can be effected without departing from the invention in its broadest aspects.

I claim:

1. A process which comprises copolymerizing a conjugated diolefin hydrocarbon selected from the group consisting of butadiene-1,3 and isoprene with a vinyl aromatic hydrocarbon in the presence of a catalyst prepared by the interaction of (a) an aluminum compound of the general formula $R_2AlX$ wherein R is selected from the group consisting of alkyl, cycloalkyl and aryl radicals and X is selected from the group consisting of hydrogen, halogen, alkyl, cycloalkyl and aryl radicals, with (b) a metal halide selected from the group consisting of the chlorides, bromides and iodides of titanium and zirconium, said copolymerizing being effected in the absence of material rendering said catalyst ineffective.

2. A process according to claim 1 wherein said diolefin hydrocarbon is butadiene-1,3.

3. A process according to claim 1 wherein said vinyl aromatic hydrocarbon is styrene.

4. A process according to claim 1 wherein butadiene is copolymerized with styrene.

5. A process according to claim 1 wherein said catalyst is prepared by the interaction of a trialkylaluminum with titanium tetrachloride.

6. A process which comprises copolymerizing butadiene with styrene in the presence of a catalyst prepared by the interaction of a trialkylaluminum with titanium tetrachloride, said copolymerizing being effected in the absence of materials rendering said catalyst ineffective.

7. A polymer prepared by copolymerizing a conjugated diolefin hydrocarbon selected from the group consisting of butadiene-1,3 and isoprene with a vinyl aromatic hydrocarbon in the presence of a catalyst prepared by the interaction of (a) an aluminum compound of the general formula $R_2AlX$ wherein R is selected from the group consisting of alkyl, cycloalkyl and aryl radicals and X is selected from the group consisting of hydrogen, halogen, alkyl, cycloalkyl and aryl radicals, with (b) a metal halide selected from the group consisting of the chlorides, bromides and iodides of titanium and zirconium, said copolymerizing being effected in the absence of materials rendering said catalyst ineffective.

8. Rubbery butadiene/styrene copolymer having a high degree of flexibility at low temperature and a broad transition range, said copolymer having been prepared by copolymerizing butadiene with a lesser weight of styrene in the presence of a catalyst prepared by the interaction of (a) an aluminum compound of the general formula $R_2AlX$ wherein R is selected from the group consisting of alkyl, cycloalkyl and aryl radicals and X is selected from the group consisting of hydrogen, halogen, alkyl, cycloalkyl and aryl radicals, with (b) a metal halide selected from the group consisting of the chlorides, bromides and iodides of titanium and zirconium, said copolymerizing being effected in the absence of materials rendering said catalyst ineffective.

9. Vulcanized polymer of claim 7.

10. Vulcanized butadiene/styrene copolymer, said copolymer having been prepared by copolymerizing butadiene with styrene in admixture with a catalyst prepared by the interaction of a trialkylaluminum with titanium tetrachloride.

11. A process which comprises copolymerizing a conjugated diolefin selecter from the group consisting of butadiene-1,3 and isoprene with styrene by contacting a mixture of said diolefin and styrene with a catalyst prepared by the interaction of (a) an aluminum compound of the general formula $R_2AlX$ wherein R is alkyl, Al is aluminum and X is selected from the group consisting of alkyl and halogen and (b) a halide of a metal selected from the group consisting of titanium and zirconium.

References Cited by the Examiner

UNITED STATES PATENTS

| | | | |
|---|---|---|---|
| 2,653,145 | 9/1953 | Hohenstein | 260—83.7 |
| 2,699,457 | 1/1955 | Ziegler et al. | 260—94.9 |
| 2,721,189 | 10/1955 | Anderson et al. | 260—94.8 |
| 2,762,790 | 9/1956 | Greene | 260—94.3 |
| 2,822,357 | 2/1958 | Brebner et al. | 260—94.9 |
| 3,058,963 | 10/1962 | Vandenberg | 260—82.1 |
| 3,112,300 | 11/1963 | Natta et al. | 260—85.3 |
| 3,114,743 | 12/1963 | Horne | 260—94.3 |
| 3,118,864 | 1/1964 | Robinson et al. | 260—85.3 |

OTHER REFERENCES

Schildknecht, "Polymer Processes," Interscience Publishers Inc., New York, 1956, p. 234 relied upon. Copy in Scientific Library.

JOSEPH L. SCHOFER, Primary Examiner.

MILTON STERMAN, A. M. BOETTCHER, D. ARNOLD, LEON J. BERCOVITZ, R. WEXLER, J. M. TEPLITZ, C. R. REAP, Assistant Examiners.

CERTIFICATE OF CORRECTION

Patent No. 3,317,492           Dated May 2, 1967

Inventor(s) Carroll A. Hochwalt

It is certified that error appears in the above-identified patent and that said Letters Patent are hereby corrected as shown below:

Column 4, line 66, the word "peirod" should read -- period --.

Column 6, lines 30, 31 and 32, the duplicate and incomplete sentence reading "However, it is an advantage of the invention that even those copolymers containing mostly vinyl aromatic hydrocarbon." should be deleted.

Column 7, line 73, the word "additional" should read -- addition --.

Claims 1, 7 and 11, line 3, that portion of the sentence reading "and isoprene" should read -- , isoprene and mixtures thereof --.

Claim 1, lines 4 and 5; Claim 6, line 2; Claim 8, line 5; Claim 10, line 3; and Claim 11, line 4; that portion of the sentence reading "catalyst prepared" should read -- catalyst reaction mixture composition in its entirety prepared --.

Claim 11, line 2, the word "selecter" should read -- selected --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents